(12) United States Patent
Hirota et al.

(10) Patent No.: US 8,147,371 B2
(45) Date of Patent: Apr. 3, 2012

(54) DIFFERENTIAL GEAR

(75) Inventors: Isao Hirota, Tochigi (JP); Masahiko Asahi, Tochigi (JP); Motoyuki Sakurai, Tochigi (JP)

(73) Assignee: GKN Driveline Torque Technology KK, Tochigi (JP)

( * ) Notice: Subject to any disclaimer, the term of this patent is extended or adjusted under 35 U.S.C. 154(b) by 572 days.

(21) Appl. No.: 12/286,080

(22) Filed: Sep. 26, 2008

(65) Prior Publication Data

US 2009/0105032 A1    Apr. 23, 2009

(30) Foreign Application Priority Data

Oct. 18, 2007 (JP) ................................. 2007-271734

(51) Int. Cl.
*F16H 48/06* (2006.01)
(52) U.S. Cl. ........................ 475/220; 475/249
(58) Field of Classification Search .................. 475/248, 475/249, 252, 253, 339, 338, 220
See application file for complete search history.

(56) References Cited

U.S. PATENT DOCUMENTS

| | | | | |
|---|---|---|---|---|
| 4,004,471 A * | 1/1977 | Keske | ............................ | 475/251 |
| 4,968,157 A * | 11/1990 | Chiba | ............................ | 384/462 |
| 5,194,054 A * | 3/1993 | Amborn et al. | ............... | 475/249 |
| 5,232,417 A | 8/1993 | Amborn et al. | | |
| 5,326,333 A * | 7/1994 | Niizawa et al. | ............... | 475/249 |
| 5,342,256 A * | 8/1994 | Amborn et al. | ............... | 475/252 |
| 5,368,528 A * | 11/1994 | Farrell | ........................... | 475/348 |
| 5,458,546 A * | 10/1995 | Teraoka | ......................... | 475/248 |
| 5,527,229 A * | 6/1996 | Ishihara et al. | ............... | 475/249 |
| 5,562,562 A * | 10/1996 | Teraoka | ......................... | 475/248 |
| 5,580,326 A * | 12/1996 | Teraoka | ......................... | 475/248 |
| 5,599,250 A * | 2/1997 | Nakajima et al. | ............. | 475/249 |
| 5,632,704 A * | 5/1997 | Yamazaki et al. | ............ | 475/248 |
| 5,984,823 A * | 11/1999 | Gage | ............................. | 475/248 |
| 6,893,372 B2 * | 5/2005 | Matsuyama et al. | .......... | 475/220 |
| 7,077,253 B2 * | 7/2006 | Maienschein | .................. | 192/3.3 |
| 2005/0054472 A1 * | 3/2005 | Nishiji | ........................... | 475/248 |

FOREIGN PATENT DOCUMENTS

| | | |
|---|---|---|
| DE | 40 13 196 | 10/1991 |
| EP | 1 460 314 | 9/2004 |
| GB | 2 244 765 | 12/1991 |
| JP | 6-137385 | 5/1994 |
| JP | 6-159451 | 6/1994 |
| JP | 6-185582 | 7/1994 |
| JP | 7-34247 | 6/1995 |
| JP | 10-068461 | 3/1998 |

\* cited by examiner

*Primary Examiner* — David D Le
*Assistant Examiner* — Jude Agendia
(74) *Attorney, Agent, or Firm* — Jordan and Hamburg LLP

(57) ABSTRACT

A differential gear has a simple structure, is able to produce a difference of differential limiting force between a driving operation of a vehicle in which the differential gear is installed and a coasting operation of the vehicle, secures the strength of a thrust bearing adopted for the differential gear, and provides a stabilized differential limiting force, in the driving operation, helical side gears receive thrusting forces acting away from each other, the differential case has inward support faces to axially support the helical side gears, the helical side gear has an annular inward counter face and an annular outward counter face on the inner circumferential side of opposite ends of a teeth area, and between the inward counter faces, there is a thrust bearing having a plurality of circumferentially arranged rollers.

8 Claims, 5 Drawing Sheets

US 8,147,371 B2

DIFFERENTIAL GEAR

BACKGROUND OF THE INVENTION

1. Field of the Invention

The present invention relates to a differential gear employing helical gears and used for a vehicle.

2. Description of Related Art

An example of a differential gear employing helical gears is disclosed in Japanese Unexamined Utility Model Application Publication No. H07-34247.

The differential gear of this disclosure is for a vehicle and has a differential case that supports a pair of helical side gears serving as helical output gears that axially face each other. On the peripheries of the helical side gears, a pair of pinion gears are arranged adjacent to each other in a circumferential direction, the pinion gears meshing with each other. One of the pinion gears meshes with one of the helical side gears and the other of the pinion gears meshes with the other of the helical side gears. Between the helical side gears, a thrust bearing is arranged. This thrust bearing exhibits a bearing function when outward thrusting forces are applied to the helical side gears to push the helical gears toward walls of the differential case.

The thrust bearing can enlarge the difference of differential limiting force between a driving operation and a coasting operation of the vehicle.

This related art, however, must arrange a hub between the helical side gears so that the hub may get in contact with the thrust bearing. This configuration complicates the structure of the differential gear.

According to the related art, the thrust bearing is positioned close to the axial center of the helical side gears. This configuration limits the size of the thrust bearing to be small. Due to the small size, the strength of the thrust bearing is insufficient to realize a structure that can secure a practical difference of differential limiting force between a driving operation and a coasting operation.

SUMMARY OF THE INVENTION

An object of the present invention is to provide a differential gear having a simple structure and employing a thrust bearing of sufficient size and strength to realize a structure of practically and stably enlarging a difference of differential limiting force between a driving operation and a coasting operation of a vehicle in which the differential gear is installed.

In order to accomplish the object, an aspect of the present invention provides a differential gear having a differential case that receives a driving force, a helical pinion gear that is arranged on an axis parallel to a rotation axis of the differential case and is rotatably held in a hole formed inside the differential case, and a pair of helical output gears that mesh with the helical pinion gear, partly axially face each other, and output driving forces. Helix angles of the helical pinion gear and helical output gears are set so that, if the differential case turns in one direction, the helical output gears receive thrusting forces axially acting away from each other, and if the differential case turns in the other direction, the helical output gears receive thrusting forces axially acting toward each other. The differential gear includes inward support faces that are formed on the differential case so as to be axially inwardly oriented and are configured to axially support the helical output gears under the thrusting forces. The differential gear also includes annular inward and outward counter faces formed on portions disposed in radial inner circumferential sides of ends of each of the helical output gears, the inward counter faces of the helical output gears faces each other, and the outward counter faces of the helical output gears faces the inward support faces of the differential case. The differential gear further includes a thrust bearing having a plurality of rollers and taking one of a configuration in which the thrust bearing is interposed between the inward support face and the outward counter face and a configuration in which the thrust bearing is interposed between the inward counter faces.

According to this aspect of the present invention, the thrust bearing has a sufficient diameter to have proper strength with respect to thrusting forces applied to the thrust bearing.

The above mentioned aspect needs no special parts for supporting the thrust bearing, thereby simplifying the structure of the differential gear.

In addition, the above-mentioned aspect can reduce a torque bias ratio (TBR).

DETAILED DESCRIPTION OF EMBODIMENTS

Figure 1:
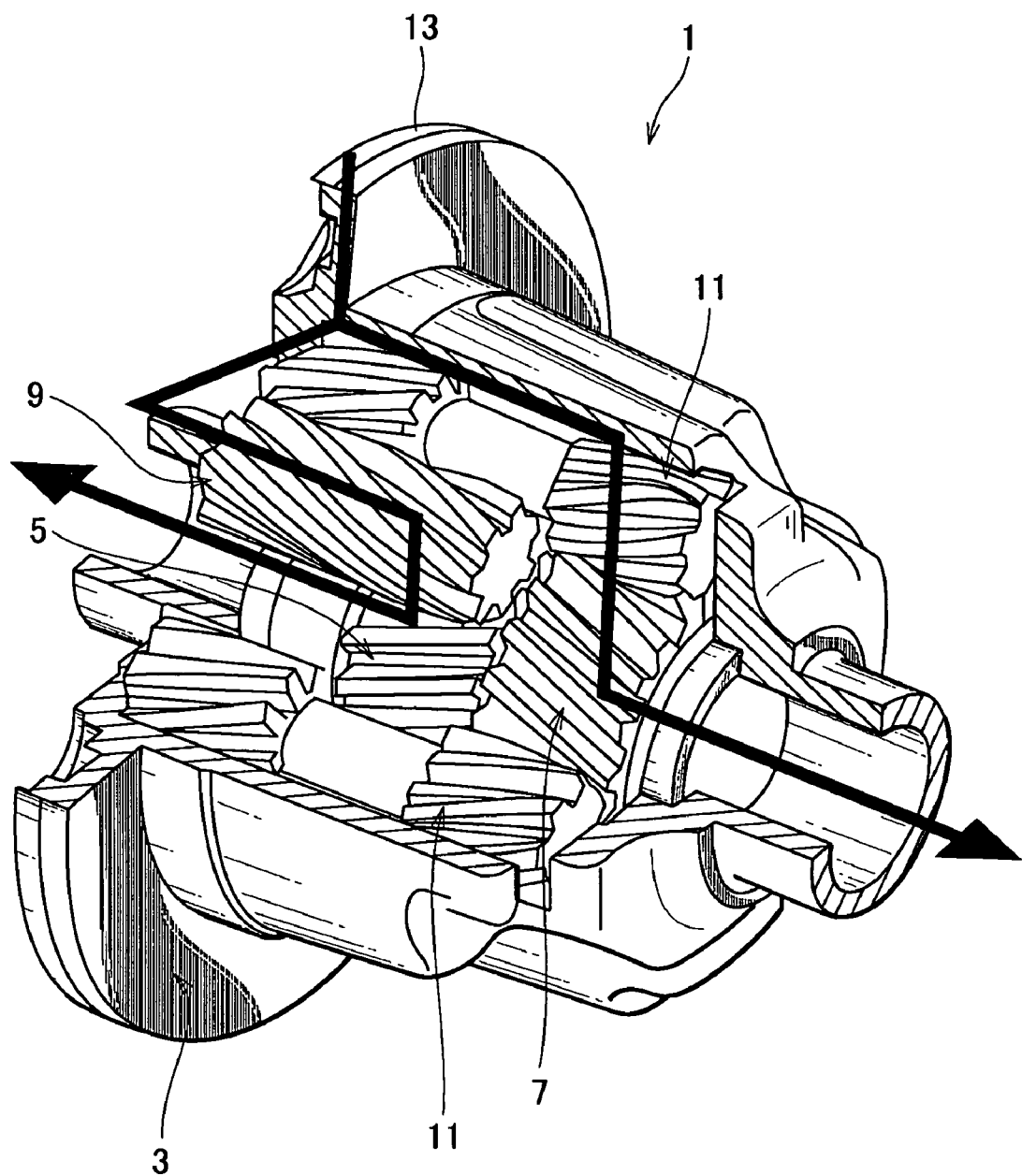
FIG. 1 is a partly broken perspective view showing a differential gear according to a first embodiment of the present invention.
Figure 2:
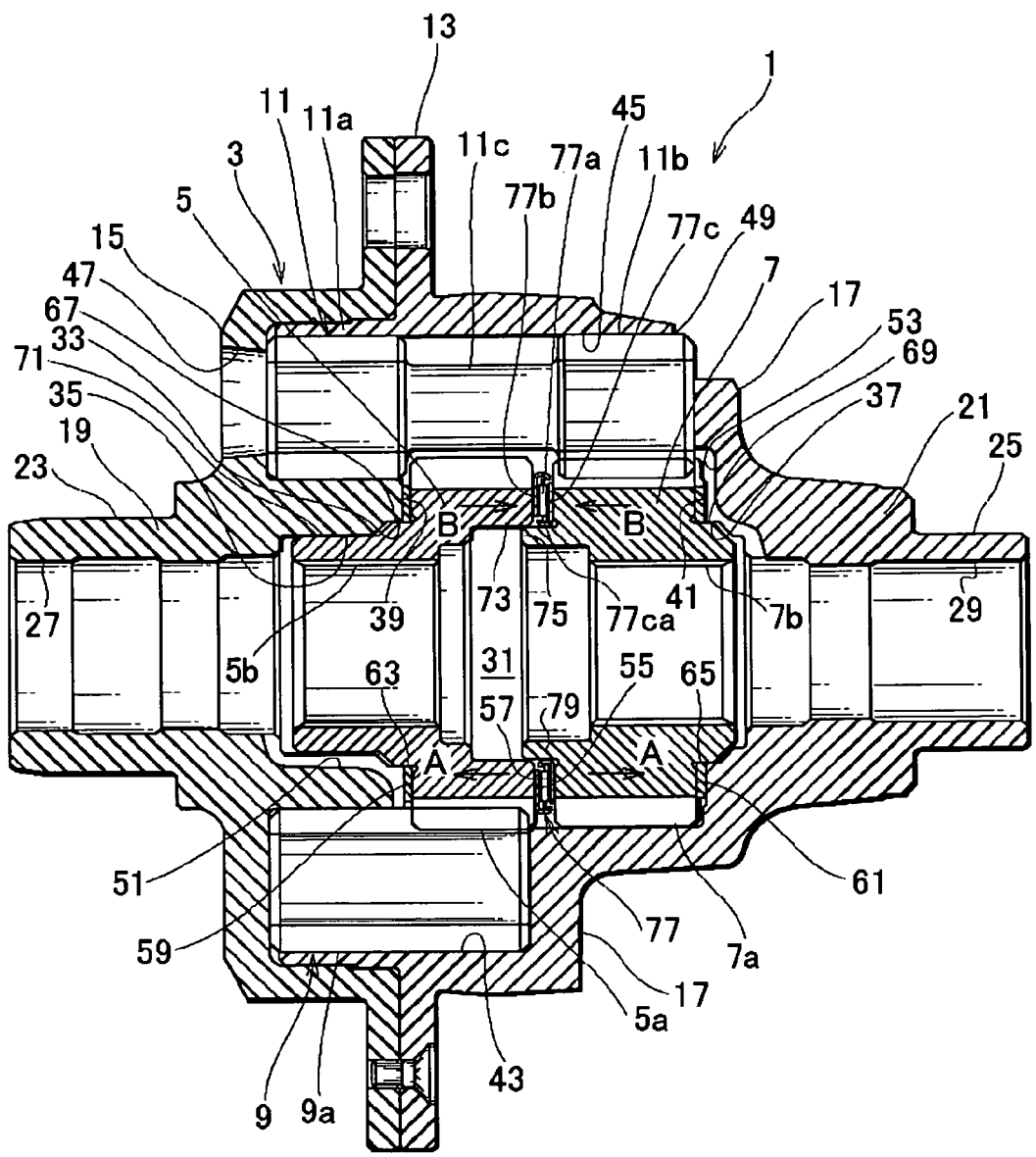
FIG. 2 is a sectional view showing the differential gear of the first embodiment.

A differential gear according to a first embodiment of the present invention will be explained with reference to FIGS. 1 and 2 in which FIG. 1 is a partly broken perspective view and FIG. 2 is a sectional view.

The differential gear 1 is used as, for example, a rear differential gear of a vehicle. Driving force generated by an engine of the vehicle is transmitted through a transmission, a propeller shaft, the differential gear 1, and rear axles to left and right rear wheels.

The differential gear 1 is arranged in a differential carrier. Driving force from the propeller shaft is transmitted through a ring gear and a drive pinion gear that mesh with each other to a differential case 3 (case) of the differential gear 1. Incidentally, it is only necessary for a member defined as a case to receive a driving force and hold pinion gears, and a shape of the case is not limited.

The differential case 3 incorporates a pair of hollow helical output gears, i.e., helical side gears 5 and 7 that face each other on a rotation axis. On the peripheries of the helical side gears 5 and 7, a pair of first and second helical pinion gears 9 and 11 serving as a pinion gear set is arranged. The first and second helical pinion gears 9 and 11 mesh with each other and circumferentially arranged side by side. The differential gear 1 employs a plurality of pairs (for example, four pairs) of the first and second helical pinion gears 9 and 11.

The differential case 3 has, on an outer circumference thereof, a flange 13 to which the ring gear is attached. The differential case 3 has side walls 15 and 17 that are provided with bosses 19 and 21, respectively. The boss 19 has, on an outer circumference thereof, a bearing support 23, and on an inner circumference thereof, a shaft hole 27. The boss 21 has, on an outer circumference thereof, a bearing support 25, and on an inner circumference thereof, a shaft hole 29.

The differential case 3 defines, around an axial center thereof, a gear housing 31. The gear housing 31 has gear supports 33, 35, and 37. The gear support 33 is continuous to an inward support face 39 that is axially inwardly oriented. The gear support 37 is continuous to an inward support face 41 that is axially inwardly oriented. The inward support faces 39 and 41 are annular around the rotation axis.

The differential case 3 includes first and second housing cavities 43 and 45. The housing cavities 43 and 45 are close to the periphery of the differential case 3, are adjacent to the inward support faces 39 and 41, are circumferentially side by side, and form a pair. Four such pairs are arranged in the differential case 3 according to the first embodiment. The housing cavities 43 and 45 have center axes that are parallel to the rotation axis of the differential case 3.

The side walls 15 and 17 of the differential case 3 have openings 47 and 49 communicating with the second housing cavity 45, to pass lubricant between the inside and outside of the differential case 3. The side wall 15 has an oil recess 51 connecting the shaft hole 27 and first housing cavity 43 to each other. The side wall 17 has an oil recess 53 connecting the shaft hole 29 and second housing cavity 45 to each other. The oil recesses 51 and 53 guide lubricant.

The first housing cavity 43 houses the first helical pinion gear 9 and the second housing cavity 45 houses the second helical pinion gear 11. The first and second helical pinion gears 9 and 11 are arranged on axes that are parallel to the rotation axis of the differential case 3.

The first helical pinion gear 9 is short and has a teeth area 9a formed entirely along the outer circumference of the helical pinion gear 9. The second helical pinion gear 11 is long and has teeth areas 11a and 11b formed at axial ends of the helical pinion gear 11. The teeth areas 11a and 11b are continuous to a central shaft 11c whose diameter is smaller than the diameter of the teeth areas 11a and 11b.

The teeth area 9a of the first helical pinion gear 9 meshes with the teeth area 11a of the second helical pinion gear 11.

The gear housing 31 houses the helical side gears 5 and 7 that mesh with the first and second helical pinion gears 9 and 11. The helical side gears 5 and 7 axially face each other and output driving forces. The helical side gear 5 has a teeth area 5a on its outer circumference and an inner spline area 5b on its inner circumference. The helical side gear 7 has a teeth area 7a on its outer circumference and an inner spline area 7b on its inner circumference. The teeth area 5a of the helical side gear 5 meshes with the teeth area 9a of the first helical pinion gear 9. The teeth area 7a of the helical side gear 7 meshes with the teeth area 11b of the second helical pinion gear 11. The inner spline area 5b is connected to a shaft passed through the shaft hole 27 and the inner spline area 7b is connected to a shaft passed through the shaft hole 29.

Helix angles of the teeth areas 9a, 11a, and 11b of the first and second helical pinion gears 9 and 11 and the teeth areas 5a and 7a of the helical side gears 5 and 7 are set such that, when the differential case 3 turns in one direction due to torque applied in a driving operation of the vehicle, the helical side gears 5 and 7 receive thrusting forces acting away from each other as indicated with arrows A, and when the differential case 3 turns in the other direction due to torque applied in a coasting operation of the vehicle, the helical side gears 5 and 7 receive thrusting forces acting toward each other as indicated with arrows B.

On portions formed in the radial inner circumferential sides being radially adjacent to end faces of the teeth area 5a (7a) of the helical side gear 5 (7), there are an annular inward counter face 55 (57) and an annular outward counter face 59 (61). The inward counter faces 55 and 57 of the helical side gears 5 and 7 face each other with an axial gap interposing between them. The outward counter face 59 and inward counter face 55 of the helical side gear 5 are formed on the opposite ends of the helical side gear 5 and the outward counter face 61 and inward counter face 57 of the helical side gear 7 are formed on the opposite ends of the helical side gear 7.

The helical side gear 5 (7) has a circumferential joint shoulder 67 (69) adjacent to the outward counter face 59 (61). The helical side gear 5 also has a joint shaft 71 adjacent to the joint shoulder 67. The joint shoulder 67 (69) joins with the gear support 33 (37) of the differential case 3. The joint shaft 71 joins with the gear support 35.

On the inner circumferential side of the inward counter face 55, the helical side gear 5 has a joint hole 73. On the inner circumferential side of the inward counter face 57, the helical side gear 7 has a joint part 75. The joint hole 73 and joint part 75 engage and support with each other.

Between the inward counter faces 55 and 57 of the helical side gears 5 and 7, there is arranged a thrust bearing 77. An axial position of the thrust bearing 77 is within the length of the central shaft 11c of the second helical pinion gear 11. The thrust bearing 77 is positioned between an end of the meshing teeth areas 9a and 5a of the first helical pinion gear 9 and helical side gear 5 and an end of the meshing teeth areas 11b and 7a of the second helical pinion gear 11 and helical side gear 7.

The thrust bearing 77 has a plurality of circumferentially-arranged rollers 77a. The rollers 77a are radially arranged with respect to the inward counter faces 55 and 57. An outer end of each roller 77a is out of the diameter of the inward counter faces 55 and 57.

The rollers 77a are arranged between a pair of annular plates 77b and 77c that are in contact with the inward counter faces 55 and 57, respectively.

The one annular plate 77b of the pair of annular plates 77b and 77c has a radial outer end portion that covers the outer ends of the rollers 77a and radially faces a radial outer end portion of the other annular plate 77c with a radial gap between them. This gap axially faces the meshing parts of the helical pinion gears 9 and 11 and helical side gears 5 and 7.

The annular plate 77c has a radial inner end 77ca that covers inner ends of the rollers 77a and radially (in the radial direction of the rollers 77a) supported by an outer circumferential face of a bearing support 79. The bearing support 79 is integral with a base of the joint part 75 of the helical side gear 7.

The annular plate 77b (77c) axially faces the teeth area 5a (7a) of the helical side gear 5 (7). The number of the rollers 77a and the number of the meshing parts of the helical side gears 5 and 7 and helical pinion gears 9 and 11 are set so that they are not divisible by a same integer. According to the first embodiment, there are four pairs of the helical pinion gears 9 and 11 around the helical side gears 5 and 7, and therefore, there are four meshing parts.

Driving force transmission of the differential gear 1 according to the first embodiment will be explained.

Driving force transmitted to the differential case 3 is transferred through the first and second helical pinion gears 9 and 11 and helical side gears 5 and 7 to the left and right axles to drive the left and right rear wheels.

If the left and right rear wheels cause differential rotation, the left and right helical side gears 5 and 7 differentially turn. This differential turn is allowed by the rotation of the first and second helical pinion gears 9 and 11. As a result, driving force from an engine of the vehicle is differentially distributed to the left and right rear wheels while the differential rotation is being allowed.

When the differential case 3 turns in one direction due to torque applied in a driving operation of the vehicle, the helical side gears 5 and 7 receive thrusting forces acting away from each other as indicated with the arrows A.

The thrusting forces push the helical side gears 5 and 7 to the inward support faces 39 and 41 of the differential case 3 through thrust washers 63 and 65. As a result, the helical side gears 5 and 7 slide on the inward support faces 39 and 41 through the washers 63 and 65, to produce a large differential limiting force.

At this time, the meshing and sliding of the teeth areas 5a, 7a, 9a, 11a, and 11b of the helical side gears 5 and 7 and first and second helical pinion gears 9 and 11 and the radial and axial pushing and sliding of the first and second helical pinion gears 9 and 11 with respect to the first and second housing cavities 43 and 45 also produce a differential limiting force.

When the differential case 3 turns in the other direction due to torque applied in a coasting operation of the vehicle, the helical side gears 5 and 7 receive thrusting forces acting toward each other as indicated with the arrows B.

The thrusting forces push the helical side gears 5 and 7 toward each other through the thrust bearing 77 so as to force the inward counter faces 55 and 57 of the helical side gears 5 and 7 on each other through the thrust bearing 77. At this time, the thrust bearing 77 functions to reduce sliding resistance between the inward counter faces 55 and 57 of the helical side gears 5 and 7. This results in enlarging the difference of differential limiting force between the driving operation and the coasting operation.

Effect of the first embodiment will be explained.

The differential gear 1 according to the first embodiment has the differential case 3 that receives a driving force, the first and second helical pinion gears 9 and 11 that are arranged on axes parallel to the rotation axis of the differential case 3 and are rotatably held in the first and second housing cavities 43 and 45 formed inside the differential case 3, and a pair of the helical side gears 5 and 7 that mesh with the helical pinion gears 9 and 11, partly axially face each other, and output driving forces. Helix angles of the helical pinion gears 9 and 11 and helical side gears 5 and 7 are set so that, if the differential case 3 turns in one direction due to torque applied in a driving operation of the vehicle in which the differential gear 1 is installed, the helical side gears 5 and 7 receive thrusting forces axially acting away from each other (arrows A), and if the differential case turns in the other direction due to torque applied in a coasting operation of the vehicle, the helical side gears 5 and 7 receive thrusting forces axially acting toward each other (arrows B). The differential gear 1 includes the inward support faces 39 and 41. The inward support faces 39 and 41 are formed on the differential case 3 so as to be axially inwardly oriented and are configured to axially support the helical side gears 5 and 7 under the thrusting forces. The annular inward and outward counter faces 55, 57, 59 and 61 formed on portions disposed in the radial inner circumferential sides of ends of each of the helical side gears 5 and 7. The inward counter faces 55 and 57 of the helical side gears 5 and 7 faces each other, and the outward counter faces 59 and 61 of the helical side gears 5 and 7 faces the inward support faces 39 and 41 of the differential case 3. The thrust bearing 77 has the rollers 77a and is interposed between the inward counter faces 55 and 57.

The thrust bearing 77 is sufficiently large to have proper strength with respect to thrusting forces applied thereto.

No special parts are needed for supporting the thrust bearing 77, and therefore, the differential gear 1 is structurally simple.

The differential gear 1 can reduce a torque bias ratio (TBR).

When the vehicle runs on a rough road, one of the rear wheels may slip. In this case, large torque is applied to the differential gear 1 and the differential gear 1 transfers a large driving force to the other rear wheel to run through the rough road. Therefore, it can improve road ability. When the vehicle runs on a good road, the differential gear 1 provides a proper differential limiting force to stabilize a steering performance and realize smooth and stable running and curving operations. In connection with a braking operation, the direction of torque in the braking operation is the same as that in the coasting operation, to reduce a differential limiting force, weaken a restricting force between the rear wheels, and avoid the interference of an engine brake with ABS.

The second helical pinion gear 11 has the shaft part 11c that is continuous to the teeth areas 11a and 11b and has a smaller diameter than the teeth areas 11a and 11b. The thrust bearing 77 is axially within the length of the shaft part 11c.

With this configuration, the outer circumference of the thrust bearing 77 never interferes with the teeth areas 11a and 11b of the second helical pinion gear 11. The diameter of the thrust bearing 77 can be extended without regard to the presence of the second helical pinion gear 11. Enlarging the size of the thrust bearing 77 results in improving the durability of the bearing 77.

The helical pinion gears 9 and 11 form a pair, are arranged on the peripheries of the pair of helical side gears 5 and 7, are circumferentially parallel to each other, and mesh with each other. The one helical pinion gear 9 meshes with the one helical side gear 5 and the other helical pinion gear 11 with the other helical side gear 7. The thrust bearing 77 is interposed between the inward counter faces 55 and 57 and is positioned between ends of meshing parts of the helical pinion gears 9 and 11 and helical side gears 5 and 7.

This configuration prevents end faces of the meshing teeth of the helical pinion gears 9 and 11 and helical side gears 5 and 7 from interfering with each other and realizes an axially compact structure.

The rollers 77a of the thrust bearing 77 are radially arranged with respect to the inward counter faces 55 and 57 of the helical side gears 5 and 7. An outer end of each of the rollers 77a is out of the diameter of the inward counter faces 55 and 57. The rollers 77a are arranged between the annular plates 77b and 77c that are in contact with the inward counter faces 55 and 57.

Even if a turning locus of the outer ends of the rollers 77a exceeds the outer diameter of the inward counter faces 55 and 57, rotational vibration of the rollers 77a is suppressed by contacts between the rollers 77a and the annular plates 77b and 77c. Also, meshing vibration transmitted from the helical side gears 5 and 7 to the rollers 77a is suppressed.

The one annular plate 77b has the radial outer end that covers an outer end of each of the other rollers 77a and radially faces the radial outer end of the annular plate 77c with a radial gap between them. This gap axially faces the meshing parts of the helical pinion gears 9 and 11 and helical side gears 5 and 7.

Between the radial gap of the annular plates 77b and 77c and the meshing teeth of the helical pinion gears 9 and 11 and helical side gears 5 and 7, lubricant can smoothly be passed to improve the durability of the differential gear 1.

The annular plate 77c covers an inner end of each of the rollers 77a. The inner end 77ca of the annular plate 77c is radially (in the radial direction of the rollers 77a) supported by the outer circumferential face of the bearing support 79 of the helical side gear 7.

This configuration stably supports the thrust bearing 77.

The rollers 77a of the thrust bearing 77 are radially arranged with respect to the inward counter faces 55 and 57 of the helical side gears 5 and 7. The rollers 77a are arranged between the annular plates 77b and 77c that are in contact with the inward counter faces 55 and 57. Parts of the annular plates 77b and 77c axially face the teeth areas 5a and 7a of the helical side gears 5 and 7. The number of the rollers 77a and the number of meshing parts of the helical side gears 5 and 7 and helical pinion gears 9 and 11 are set not to be divisible by a same integer.

This configuration greatly reduces (lower than 1/10) the occurrence of a resonance between the thrusting force vibration due to meshing gears and the rotational vibration of the rollers 77a. This results in stabilizing the functioning of the thrust bearing 77.

The differential case 3 turns in one direction due to torque applied in a driving operation and in the other direction due to torque applied in a coasting operation. The thrust bearing 77 is interposed between the inward counter faces 55 and 57 of the helical side gears 5 and 7.

In the driving operation, the helical side gears 5 and 7 are pushed to the inward support faces 39 and 41 of the differential case 3, to stabilize frictional forces generated by thrusting forces. In the coasting operation, the thrust bearing 77 arranged between the helical side gears 5 and 7 cancels frictional forces caused by thrusting forces.

A differential gear according to a second embodiment of the present invention will be explained with reference to FIG. 3 that is a sectional view showing a differential gear 1A according to the second embodiment of the present invention. The second embodiment is basically the same as the first embodiment, and therefore, the second embodiment employs the same reference marks or the same reference marks plus "A" for parts that are the same as or correspond to those of the first embodiment.

Figure 3:
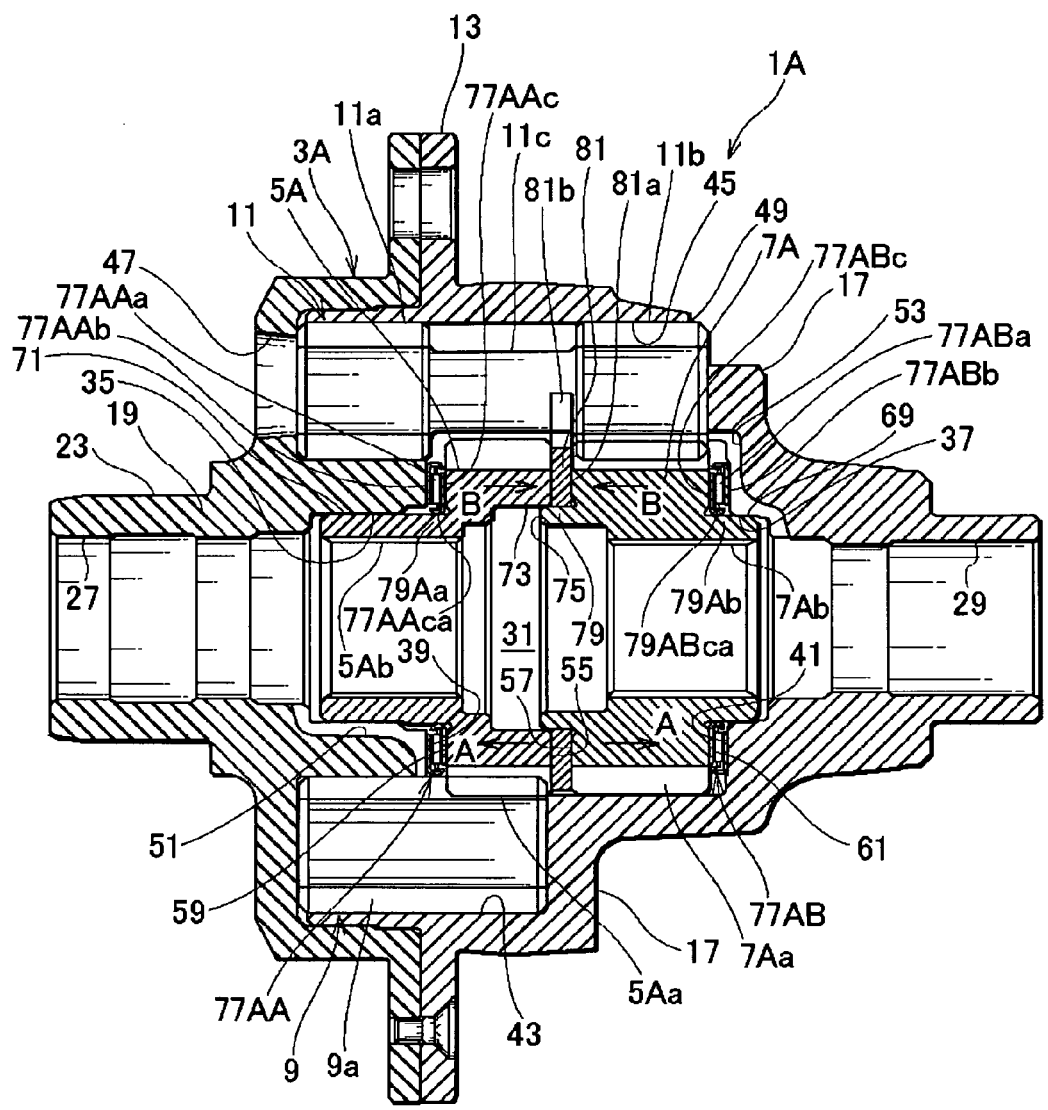
FIG. 3 is a sectional view showing a differential gear according to a second embodiment of the present invention.

In FIG. 3, the differential gear 1A has a differential case 3A that is provided with inward support faces 39 and 41. A pair of helical side gears 5A and 7A are provided with outward counter faces 59 and 61, respectively. A thrust bearing 77AA is arranged between the inward support face 39 and the outward counter face 59 and a thrust bearing 77AB is arranged between the inward support face 41 and the outward counter face 61. The thrust bearing 77AA (77AB) has a plurality of rollers 77AAa (77ABa) arranged in a circumferential direction. The rollers 77AAa (77ABa) are radially arranged with respect to the outward counter face 59 (61). Outer ends of the rollers 77AAa (77ABa) are within the outer diameter of the outward counter face 59 (61).

The rollers 77AAa (77ABa) are arranged between a pair of annular plates 77AAb (77ABb) and 77AAc (77ABc). The one annular plate 77AAb (77ABb) is in contact with the inward support face 39 (41) of the differential case 3A and the other annular plate 77AAc (77ABc) is in contact with the outward counter face 59 (61) of the helical side gear 5A (7A).

In the pair of annular plates 77AAb and 77AAc (77ABb and 77ABc), the annular plate 77AAb (77ABb) has a radial outer end that covers the outer ends of the rollers 77AAa (77ABa) and radially faces a radial outer end of the other annular plate 77AAc (77ABc) with a radial gap interposing between them. The gap between the annular plates 77AAb and 77AAc (77ABb and 77ABc) axially faces a meshing part of the helical pinion gear 9 (11) and helical side gear 5A (7A).

In the pair of annular plates 77AAb and 77AAc (77ABb and 77ABc), the other annular plate 77Aac (77ABc) has a radial inner end 77AAca (77ABca) that covers inner ends of the rollers 77AAa (77ABa) and is supported on an outer circumferential face of a bearing support 79Aa (79Ab) of the helical side gear 5A (7A).

The bearing support 79Aa (79Ab) is formed in a portion radially adjacent to the outward counter face 59 (61).

Between the helical side gears 5A and 7A, there is arranged an annular plate 81. The annular plate 81 has an annular part 81a and an engaging part 81b. The annular part 81a extends along the inward counter faces 55 and 57 and teeth areas 5Aa and 7Aa of the helical side gears 5A and 7A. The engaging part 81b radially extends from the outer circumference of the annular part 81a to engage with a shaft 11c of the second helical pinion gear 11, so that the annular plate 81 may not turn relative to the differential case 3A.

In the differential gear 1A, helix angles of the teeth areas 9a, 11a, and 11b of the first and second helical pinion gears 9 and 11 and the teeth areas 5Aa and 7Aa of the helical side gears 5A and 7A are set such that, when the differential case 3A turns in one dire direction due to torque applied in a driving operation of the vehicle, the helical side gears 5A and 7A receive thrusting forces acting toward each other as indicated with arrows B, and when the differential case 3A turns in the other direction due to torque applied in a coasting operation of the vehicle, the helical side gears 5A and 7A receive thrusting forces acting away from each other as indicated with arrows A.

A driving force transmitting operation of the second embodiment is essentially similar to that of the first embodiment.

According to the second embodiment, the differential case 3A turns in one direction due to torque applied in a driving operation of the vehicle in which the differential gear 1A is installed. At this time, the helical side gears 5A and 7A receive thrusting forces acting toward each other as indicated with arrows B.

As a result, the helical side gears 5A and 7A are pushed through the annular plate 81 toward each other to force the inward counter faces 55 and 57 of the helical side gears 5A and 7A through the annular plate 81. Namely, the inward counter faces 55 and 57 of the helical side gears 5A and 7A slide on the annular plate 81 to generate a large differential limiting force.

The differential case 3 turns in the other direction due to torque applied in a coasting operation of the vehicle. At this time, the helical side gears 5A and 7A receive thrusting forces acting away from each other as indicated with arrows A.

As a result, the helical side gears 5A and 7A are pushed to the inward support faces 39 and 41 of the differential case 3A through the thrust bearings 77AA and 77AB. At this time, the thrust bearings 77AA and 77AB function to reduce slide resistance to expand a difference of differential limiting force between the coasting operation and the driving operation.

In this way, the second embodiment realizes effect similar to that realized by the first embodiment.

Figure 4:
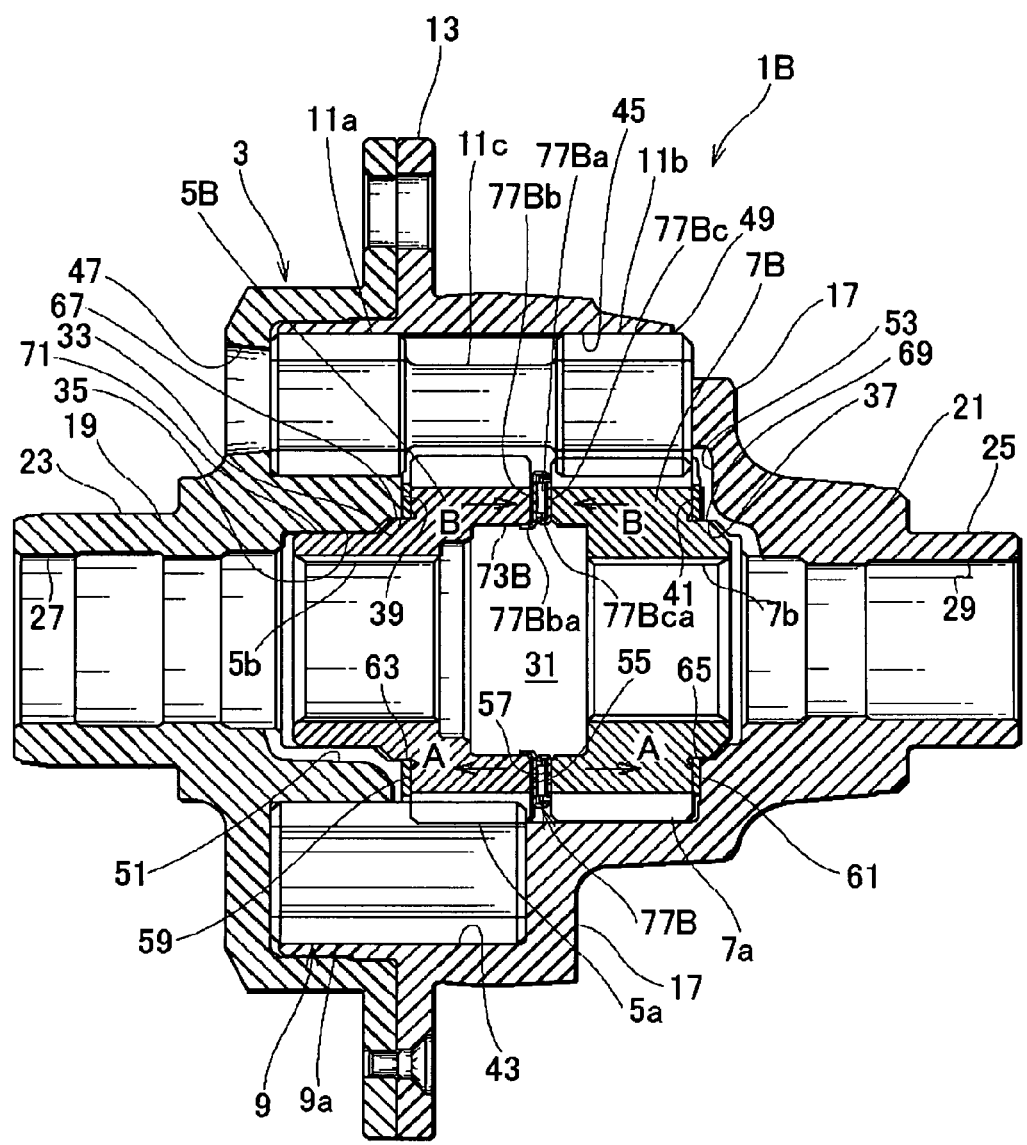
FIG. 4 is a sectional view showing a differential gear according to a third embodiment of the present invention.

A differential gear according to a third embodiment of the present invention will be explained with reference to FIG. 4 that is a sectional view showing a differential gear 1B according to the third embodiment of the present invention. The third embodiment is basically the same as the first embodiment, and therefore, the third embodiment employs the same reference marks or the same reference marks plus "B" for parts that are the same as or correspond to those of the first embodiment.

According to the third embodiment, the differential gear 1B employs a specific support structure on the inner circumferential side of a thrust bearing 77B.

In a pair of annular plates 77Bb and 77Bc of the thrust bearing 77B, the one annular plate 77Bb has a radial outer end that covers outer ends of rollers 77Ba and the other annular plate 77Bc has a radial inner end 77Bca that covers inner ends of the rollers 77Ba. However, a helical side gear 7B has no bearing support for the annular plate 77Bc. A radial inner end 77Bba of the annular plate 77Bb extends radially inwardly, engages with a hole 73B of a helical side gear 5B and is radially supported thereby.

The other parts of the third embodiment are the same as those of the first embodiment.

A driving force transmitting operation of the third embodiment will be explained.

A differential case 3B of the differential gear 1B turns in one direction due to torque applied in a driving operation of the vehicle in which the differential gear 1B is installed, like the first embodiment. At this time, the helical side gears 5B and 7B receive thrusting forces acting away from each other as indicated with arrows A. The differential case 3B turns in the other direction due to torque applied in a coasting operation of the vehicle. At this time, the helical side gears 5B and 7B receive thrusting forces acting toward each other as indicated with arrows B.

As a result, the third embodiment achieves effect similar to that achieved by the first embodiment.

Figure 5:
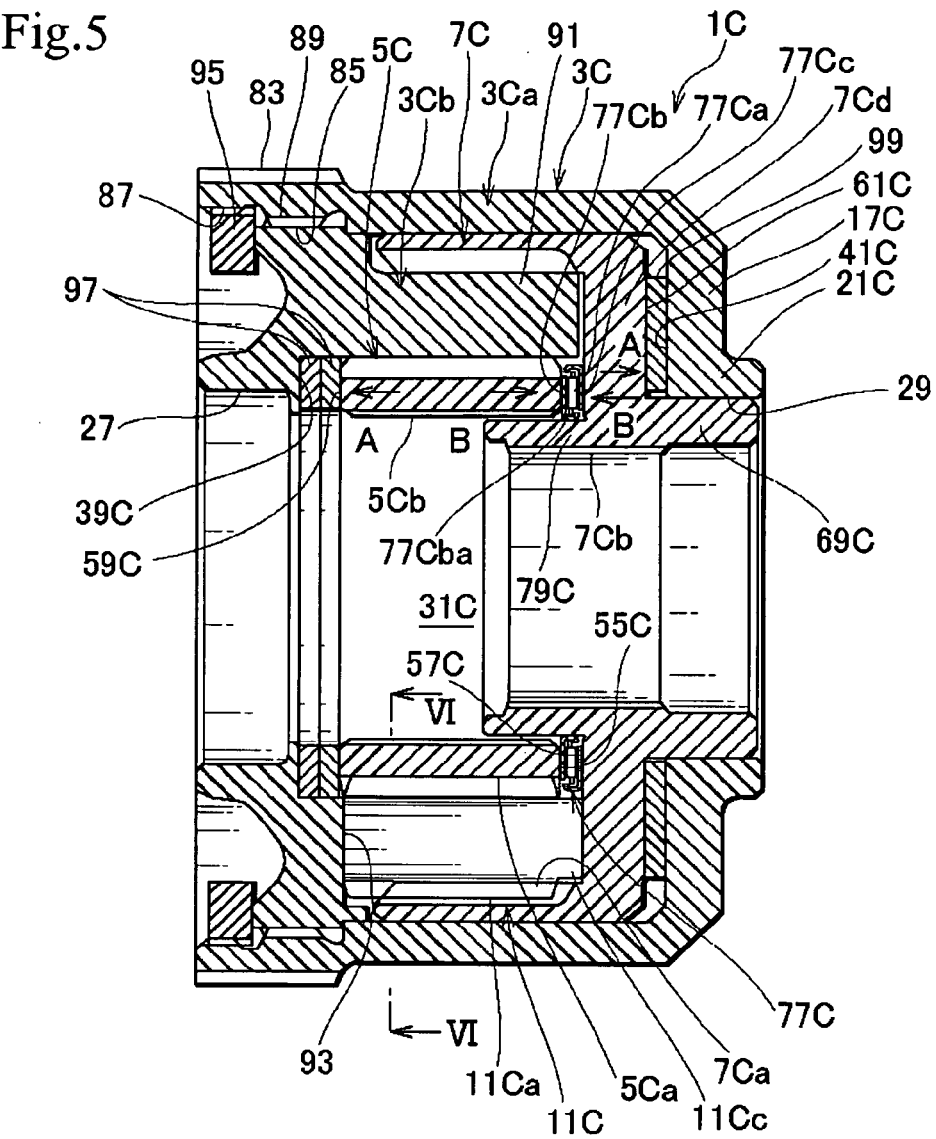
FIG. 5 is a sectional view showing a differential gear according to a fourth embodiment of the present invention.
Figure 6:
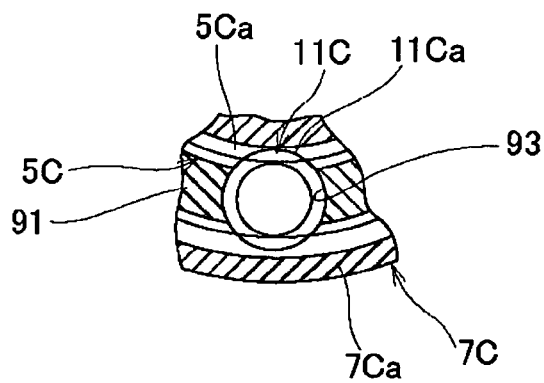
FIG. 6 is a sectional view taken along a line VI-VI of FIG. 5.

A differential gear according to a third embodiment of the present invention will be explained with reference to FIGS. 5 and 6. FIG. 5 is a sectional view showing a differential gear 1C according to a fourth embodiment of the present invention and FIG. 6 is a sectional view taken along a line VI-VI of FIG. 5. The fourth embodiment is basically the same as the first embodiment, and therefore, the fourth embodiment employs the same reference marks or the same reference marks plus "C" for parts that are the same as or correspond to those of the first embodiment.

As shown in FIGS. 5 and 6, the differential gear 1C has a differential case 3C consisting of an outer case 3Ca and an inner case 3Cb.

The outer case 3Ca has, on the periphery of a first axial end thereof, input splines 83. An inner circumference of the outer case 3Ca has a first female thread 85 and a second female thread 87 in a stepped shape. A second axial end of the outer case 3Ca has a side wall 17C. An inner circumference of the side wall 17C forms a boss 21C.

The inner case 3Cb has, on the periphery of a first axial end thereof, a male thread 89, and at a second axial end thereof, a gear support 91 that protrudes axially. The gear support 91 has a plurality of housing holes 93 in a circumferential direction. The male thread 89 of the inner case 3Cb is screwed into with the first female thread 85 of the outer case 3Ca to fasten the inner case 3Cb to the outer case 3Ca. A lock nut 95 is fastened to the second female thread 87 to prevent the inner case 3Cb from loosening.

Each of the housing hole 93 houses a helical pinion gear 11C having a shaft 11Cc of smaller diameter. The helical pinion gear 11C is arranged on an axis that is parallel to a rotation axis of the differential case 3C.

The differential case 3C defines a gear housing 31C that houses helical output gears 5C and 7C that mesh with the helical pinion gears 11C and axially face each other to output driving forces. The helical output gear 5C has, at its outer periphery, a teeth area 5Ca, the helical output gear 7C has an annular wall 7Cd radially outwardly extending and a cylindrical body axially extending from the periphery of the annular wall 7Cd. The helical output gear 7C is provided with a teeth area 7Ca at an inner periphery of the cylindrical body of the helical output gear 7C. The helical output gears 5C and 7C are provided with inner splines 5Cb and 7Cb to be engaged with an axle on inner circumferences, respectively.

The teeth area 5Ca of the helical output gear 5C meshes with a teeth area 11Ca of each helical pinion gear 11C from the inner side of the helical pinion gear 11C. The teeth area 7Ca of the helical output gear 7C forms an internal gear that meshes with the teeth area 11Ca of each helical pinion gear 11C from the outer side of the helical pinion gear 11C. The teeth area 7Ca of the helical output gear 7C is integral with a joint shaft 69C and is on the peripheral side of the joint shaft 69C with an annular wall 7Cd interposing between them. The teeth area 7Ca may be separated from and fixed to the joint shaft 69C.

Helix angles of the teeth areas 11Ca of the helical pinion gears 11C and the teeth areas 5Ca and 7Ca of the helical output gears 5C and 7C are set so that, if the differential case 3C turns in one direction due to torque applied in a driving operation of the vehicle in which the differential gear 1C is installed, the helical output gears 5C and 7C receive thrusting forces acting away from each other as indicated with arrows A, and if the differential case 3C turns in the other direction due to torque applied in a coasting operation of the vehicle, the helical output gears 5C and 7C receive thrusting forces acting toward each other as indicated with arrows B.

According to the fourth embodiment, an inward support face 39C is formed at one end of an inner circumference of the inner case 3Cb and an inward support face 41C is formed on the side wall 17C of the outer case 3Ca. An annular inward counter face 55C and an annular outward counter face 59C are formed on portions disposed in the radial inner circumferential sides of end faces of the helical output gear 5C. An inward counter face 57C and an outward counter face 61C are formed on the annular wall 7Cd of the helical output gear 7C and are on portions disposed in the inner circumferential sides of an ends of the teeth area 7Ca of the helical output gear 7C.

Between the inward counter faces 55C and 57C of the helical output gears 5C and 7C, there is arranged a thrust bearing 77C. An axial position of the thrust bearing 77C is within the length of the shaft 11Cc of each helical pinion gear 11C.

Outer ends of rollers 77Ca of the thrust bearing 77C are out of the diameter of the inward counter face 55C.

The thrust bearing 77C has a pair of annular plates 77Cb and 77Cc to hold the rollers 77Ca between them. The other annular plate 77Cc has a radial outer end that covers the outer ends of the rollers 77Ca and radially faces a radial outer end of the one annular plate 77Cb with a radial gap interposing between them. The gap between the annular plates 77Cb and 77Cc axially faces the meshing teeth of the helical pinion gears 11C and helical output gear 5C.

The one of the annular plate 77Cb has a radial inner end 77Cba that covers an inner end of each roller 77Ca and is radially (in the radial direction of each roller 77Ca) supported by an outer circumferential face of a bearing support 79C. The bearing support 79C is integral with an inner circumference of the annular wall 7Cd of the helical output gear 7C.

The annular plate 77Cb axially faces the teeth area 5Ca of the helical output gear 5C. The number of the rollers 77Ca and the number of meshing parts of the helical output gear 5C and helical pinion gears 11C are set not to be divided by a same integer. If six helical pinion gears 11C are arranged around the helical output gear 5C, the number of the meshing parts of the helical output gear 5C and helical pinion gears 11C is six.

Between the outward counter face 59C of the helical output gear 5C and the inward support face 39C of the inner case 3Cb, there are two thrust bushings 97. Between the outward counter face 61C of the helical output gear 7C and the inward support face 41C of the outer case 3Ca, there is a large thrust bushing 99 having a large diameter.

A driving force transmitting operation of the differential gear 1C according to the fourth embodiment will be explained.

When the differential case 3C receives a driving force, the housing holes 93 of the gear support 91 of the inner case 3Cb transmit a revolving force to the helical pinion gears 11C. The helical pinion gears 11C transmit the force to the helical output gears 5C and 7C, which provide output forces.

If the helical output gears 5C and 7C produce differential rotation, the helical pinion gears 11C turn to accept the differential rotation and provide differentially-distributed outputs.

If the differential case 3C turns in one direction due to torque applied in a driving operation of the vehicle in which the differential gear 1C is installed, the helical output gears 5C and 7C receive thrusting forces acting away from each other as indicated with arrows A.

The thrusting forces push the helical output gears 5C and 7C to the inward support faces 39C and 41C of the differential case 3C through the thrust bushings 97 and 99. At this time, the helical output gears 5C and 7C slide on the inward support faces 39C and 41C through the thrust bushings 97 and 99, to produce a large differential limiting force.

At the same time, the meshing and sliding operations of the teeth areas 5Ca, 7Ca, and 11Ca of the helical output gears 5C and 7C and helical pinion gears 11C and the radial and axial pushing and sliding operations of the helical pinion gears 11C with respect to the housing holes 93 also produce a differential limiting force.

If the differential case 3C turns in the other direction due to torque applied in a coasting operation of the vehicle, the helical output gears 5C and 7C receive thrusting forces acting toward each other as indicated with arrows B.

The thrusting forces push the helical output gears 5C and 7C to each other through the thrust bearing 77C. At this time, the thrust bearing 77C functions to reduce sliding resistance, thereby expanding a difference of differential limiting force between the coasting operation and the driving operation.

In this way, the fourth embodiment achieves effect similar to that achieved by the first embodiment.

Incidentally, the meshing part of the helical pinion gears 9 and 11 of the first, second and third embodiments may be formed on each side in the axial direction of the helical output gears 5 and 7 (5A, 5B and 7A, 7B) so that the number of meshing parts of the helical pinion gears 9 and 11 is two in the axial direction.

The thrust bearing 77C of the fourth embodiment may be disposed between the inward support face 39C and the outward counter face 59C or between the inward support face 41C and the outward counter face 61C, and the thrust bearing 77C between the inward counter faces 55C and 57C may be omitted. In this case, the inward counter faces 55C and 57C may be configured in contact with each other directly, or a slide member such as the thrust bushings 97 and 99 may be disposed between the inward counter faces 55C and 57C sliding on the slide member.

What is claimed is:

1. A differential gear comprising, a differential case configured to receive a driving force, a helical pinion gear arranged on an axis parallel to a rotation axis of the differential case and rotatably held in a hole formed inside the differential case, a pair of helical output gears meshing with the helical pinion gear, partly axially facing each other and outputting driving forces, and helix angles of the helical pinion gear and helical output gears being set so that, if the differential case turns in a first direction, the helical output gears receive thrusting forces axially acting away from each other, and if the differential case turns in a second direction, the helical output gears receive thrusting forces axially acting toward each other, the differential gear further comprising:

inward support faces formed on the differential case so as to be axially inwardly oriented and configured to axially support the helical output gears under the thrusting forces;

annular inward and outward counter faces formed on radial inner circumferential sides of ends of each helical output gear, the inward counter faces of the helical output gears facing each other, the outward counter faces of the helical output gears facing the inward support faces of the differential case; and a thrust bearing having a plurality of rollers and and a pair of annular plates interposed in at least one of a first gap defined axially between each inward support face and each outward counter face and a second gap defined axially between the inward counter faces, the annular plates in the first gap being in contact with the inward support face and outward counter face thereof and the annular plates in the second gap being in contact with the inward counter faces thereof;

the helical output gears being pushed axially toward the first gap in reaction to the thrusting forces resulting from the turning of the case in the first direction so as to slide each outward counter face on each inward support face or to slide the inward counter faces on each other so as to produce differential limiting force, the helical output gears being pushed axially toward the second gap in reaction to the thrusting forces resulting from the turning of the case in the second direction so as to force the inward counter faces on each other or each outer counter face on each inward support face through the thrust bearing so as to reduce sliding resistance therebetween;

the rollers of the thrust bearing being arranged radially with respect to the inward and outward counter faces; and one of the annular plates comprises a radial inner end radially and directly supported by one of the helical output gears.

2. The differential gear of claims 1, further comprising:

a shaft part provided with the helical pinion gear, being continuous to a teeth area of the helical pinion gear and having a smaller diameter than the teeth area; and the thrust bearing being axially within the length of the shaft part.

3. The differential gear of claim 1, wherein:

an outer end of each of the rollers is within the diameter of a corresponding one of the inward and outward counter faces.

4. The differential gear of claim 1, wherein:

the helical pinion gear is a pair of helical pinion gears arranged on peripheries of the pair of helical output gears, are circumferentially parallel to each other, and mesh with each other;

one of the pair of helical pinion gears meshes with one of the helical output gears and the other thereof with the other of the helical output gears; and the thrust bearing is axially interposed between the inward counter faces of the helical output gears and is positioned between ends of meshing parts of the helical pinion gears and helical output gears.

5. The differential gear of claim 1, wherein:

an outer end of each of the rollers is out of the diameter of a corresponding one of the inward and outward counter faces.

6. The differential gear of claim 1, wherein:

one of the annular plates covers one of inner and outer ends of each of the rollers and radially faces the other of the annular plates with a gap between them; and the gap axially faces a meshing part of the helical pinion gear and helical output gear.

7. The differential gear of claim 1, wherein:

the rollers of the thrust bearing are radially arranged with respect to one of the inward and outward counter faces;

the rollers are arranged between a pair of annular plates that are in contact with the inward counter faces, or in contact with the inward support face and outward counter face; part of the annular plates axially faces a teeth area of the helical output gears; and each of the number of the rollers and the number of meshing parts of the helical output gears and helical pinion gear is divisible by a different integer so that the number of rollers is not evenly divisible by the numbers of meshing parts, and vice versa.

8. The differential gear of claim 1, wherein:

the differential case turns in the first direction when receiving torque during a driving operation of a vehicle in which the differential gear is installed and in the second direction when receiving torque during a coasting operation of the vehicle; and the thrust bearing is interposed between the inward counter faces of the helical output gears.

* * * * *